United States Patent
Pinto et al.

(10) Patent No.: US 8,371,110 B2
(45) Date of Patent: Feb. 12, 2013

(54) METHOD FOR REGENERATING A PARTICULATE FILTER OF AN INTERNAL-COMBUSTION ENGINE

(75) Inventors: Simona Pinto, Bari (IT); Luigi Gentile, Massafra (IT); Antonio Mattia, Modugno (IT); Gaetano Grasso, Giovinazzo (IT); Daniele De Gennaro, Molfetta (IT)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 12/602,209

(22) PCT Filed: May 28, 2008

(86) PCT No.: PCT/EP2008/056532
§ 371 (c)(1),
(2), (4) Date: Nov. 30, 2009

(87) PCT Pub. No.: WO2008/145667
PCT Pub. Date: Dec. 4, 2008

(65) Prior Publication Data
US 2010/0186372 A1 Jul. 29, 2010

(30) Foreign Application Priority Data
Jun. 1, 2007 (IT) .............................. MI2007A1123

(51) Int. Cl.
*F01N 3/025* (2006.01)
(52) U.S. Cl. ................ 60/295; 60/274; 60/286; 60/289; 60/297; 60/303; 60/311

(58) Field of Classification Search ............ 60/274, 60/286, 289, 290, 295, 297, 303, 311; 123/1 A, 123/3, 495, 698; 417/199.1–206
See application file for complete search history.

(56) References Cited

U.S. PATENT DOCUMENTS

| | | | | |
|---|---|---|---|---|
| 3,964,459 A * | 6/1976 | Kimberley | .................... | 123/390 |
| 5,806,310 A | 9/1998 | Daidou et al. | | |
| 6,126,407 A * | 10/2000 | Guentert et al. | .............. | 417/244 |
| 6,823,845 B2 * | 11/2004 | Schueler | ........................ | 123/446 |
| 7,152,583 B2 * | 12/2006 | Abe et al. | ........................ | 123/446 |
| 7,963,105 B2 * | 6/2011 | Tagawa et al. | ................... | 60/286 |
| 2003/0017057 A1 * | 1/2003 | Suzuki et al. | ................. | 417/206 |
| 2003/0061802 A1 * | 4/2003 | Nakatani et al. | ................ | 60/284 |
| 2005/0247048 A1 * | 11/2005 | Schaller et al. | ................. | 60/286 |
| 2006/0225407 A1 | 10/2006 | Tahara et al. | | |

(Continued)

FOREIGN PATENT DOCUMENTS

DE 102006009099 A1 8/2007
EP 1176290 A1 1/2002

(Continued)

*Primary Examiner* — Thomas Denion
*Assistant Examiner* — Jorge Leon, Jr.
(74) *Attorney, Agent, or Firm* — Michael Best & Friedrich LLP

(57) ABSTRACT

A method for regenerating a particulate filter of an internal-combustion engine, provides for air to be supplied into the exhaust gas pipe upstream of the particulate filter in order to perform post-combustion in the exhaust gas pipe. The method provides for fuel to be supplied to the cylinders of the internal-combustion engine by means of a high-pressure pumping unit, and for fuel to be supplied into the exhaust pipe upstream of the particulate filter by means of the high-pressure pumping unit.

14 Claims, 1 Drawing Sheet

U.S. PATENT DOCUMENTS

2006/0236683 A1  10/2006  Matsuno et al.
2007/0227126 A1  10/2007  Wang et al.

FOREIGN PATENT DOCUMENTS

| | | |
|---|---|---|
| EP | 1510679 A2 | 3/2005 |
| EP | 1933014 A1 | 6/2008 |
| EP | 1953358 A1 | 8/2008 |
| FR | 2904361 A1 | 2/2008 |
| JP | 11324856 | 11/1999 |
| JP | 2002039006 | 2/2002 |
| JP | 2003041929 | 2/2003 |
| JP | 2005256725 | 9/2005 |
| WO | 2005088090 A1 | 9/2005 |
| WO | 2006080875 | 8/2006 |
| WO | 2007026904 A1 | 3/2007 |
| WO | 2007058015 A1 | 5/2007 |
| WO | 2007093749 A2 | 8/2007 |

* cited by examiner

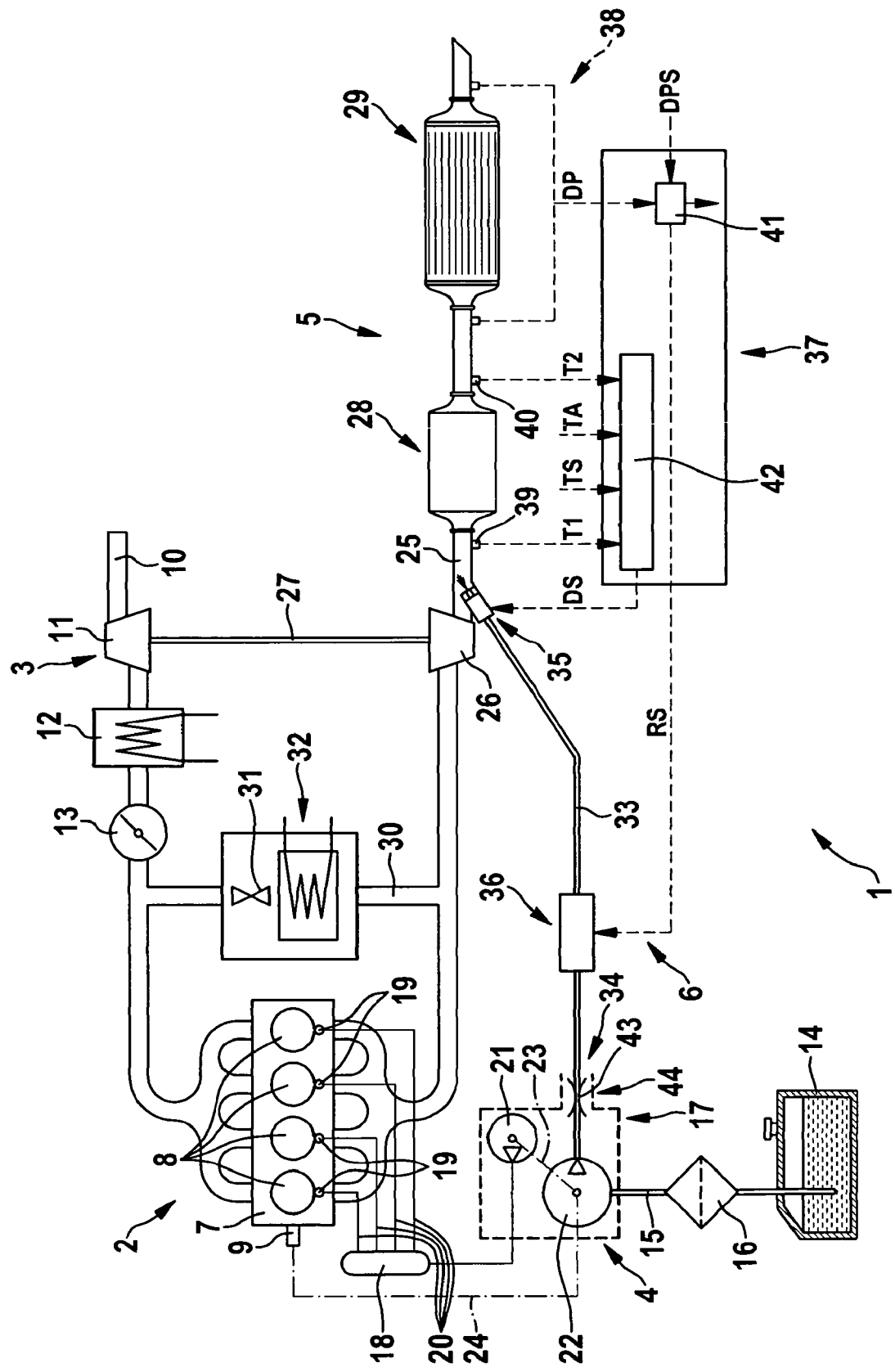

METHOD FOR REGENERATING A PARTICULATE FILTER OF AN INTERNAL-COMBUSTION ENGINE

CROSS-REFERENCE TO RELATED APPLICATION

This application is a 35 USC 371 application of PCT/EP2008/056532 filed on May 28, 2008.

BACKGROUND OF THE INVENTION

1. Field of the Invention

The present invention relates to a method for regenerating a particulate filter of an internal-combustion engine and also relates to an internal-combustion engine which performs the method.

2. Description of the Prior Art

The emissions of diesel-powered internal-combustion engines contain a considerable amount of particulate and are subject to stringent anti-pollution regulations. Diesel-powered internal-combustion engines are equipped with a particulate filter so as to retain the particulate and comply with given anti-pollution parameters laid down by the existing regulations. The capacity of the particulate filter is limited and periodically the particulate filter must be regenerated by means of cycles for burning off the particulate in the filter. Combustion of the particulate produces carbon dioxide which is expelled from the filter together with the exhaust gases and in effect ensures cleaning of the particulate filter. The need to perform regeneration of the particulate filter depends on the running speed of the internal-combustion engine and the running speed transients. In fact, particular operating conditions of the internal-combustion engine give rise to temperatures of the exhaust gases able to initiate combustion of the particulate retained by the filter and, at the same time, produce the supply of oxygen needed to perform combustion and partially free the filter of the particulate. However, the running speeds and transients which give rise to the abovementioned conditions are not maintained for a sufficient amount of time to cause complete regeneration (cleaning) of the particulate filter and consequently the temperature and excess air conditions of the exhaust gases must be determined and maintained for a sufficient amount of time in order to perform complete regeneration (cleaning) of the particulate filter.

The temperature needed to trigger combustion of the particulate within the particulate filter is provided by means of post-combustion in the exhaust-gas pipe of excess air and fuel supplied in the exhaust-gas pipe.

Post-combustion is performed upstream of the particulate filter along the exhaust-gas pipe and involves the supply of fuel to this point at an average pressure of more than 6 bar. This means that the vehicle must be equipped with a fuel pump able to supply the fuel upstream of the particulate filter in any operating condition of the internal-combustion engine.

OBJECT AND SUMMARY OF THE INVENTION

The object of the present invention is to provide a method for regenerating a particulate filter of an internal-combustion engine which does not have the drawbacks of the known art and which, in particular, is particularly economical.

According to the present invention a method for regenerating a particulate filter of an internal-combustion engine is provided. The method includes the steps of supplying comburent air into the exhaust pipe upstream of the particulate filter in order to perform post-combustion in the exhaust pipe and supplying the fuel to the cylinders of the internal-combustion engine by means of a high-pressure pumping unit, and supplying the fuel into the exhaust pipe by means of the high-pressure pumping unit.

According to the present invention an internal combustion engine is provided. The internal combustion engine includes a drive unit provided with cylinders, an exhaust unit comprising a particulate filter, and a comburent air supply unit for supplying the cylinders and the exhaust unit. A unit for supplying the fuel to the cylinders is embodied by a high-pressure pumping unit. A supply device for supplying post-combustion fuel to the exhaust unit is provided, which has a supply line connected to a pressurized-fuel outlet of the high-pressure pumping unit.

BRIEF DESCRIPTION OF THE DRAWING

Further characteristic features and advantages of the present invention will become clear from the description which follows of a non-limiting example of embodiment thereof, with reference to the accompanying FIGURE.

FIG. 1 is a schematic view, with parts removed for the sake of clarity, of an internal-combustion engine provided according to the present invention.

DESCRIPTION OF THE PREFERRED EMBODIMENT

In the accompanying FIGURE, 1 denotes overall an internal-combustion engine which comprises a drive unit 2; a unit 3 for supplying comburent air to the drive unit 2; a unit 4 for supplying fuel, more specifically diesel fuel, to the drive unit 2; an exhaust unit 5 for the combusted gases; and a device 6 for supplying fuel into the exhaust unit 5 for performing post-combustion in the exhaust unit 5.

The drive unit 2 comprises a cylinder head 7 containing four cylinders 8, each of which communicates directly with the comburent-air supply unit 3, with the fuel supply unit 4 and with the exhaust unit 5. The drive unit 2 converts the thermal energy into mechanical energy which is supplied to a driving shaft 9.

The comburent-air supply unit 3 comprises a supply pipe 10 connected to each cylinder 8, a compressor 11, a heater 12 and a valve 13 for regulating the air flow.

The fuel supply unit 4 is of the so-called common-rail type and comprises a fuel tank 14 and a supply line 15 which has, arranged along it in succession, a filter 16, a high-pressure pumping unit 17 and a common distribution manifold 18 for all the cylinders 8. The supply device 4 comprises four injectors 19, each of which is associated with a respective cylinder 8 and is connected to the distribution manifold 18 by a respective line 20.

The high-pressure, pumping unit 17 comprises a piston pump 21 and a gear pump 22 which has the function of supplying the piston pump 21 and, selectively, the fuel supply device 6. The high-pressure pumping unit 17 comprises a shaft 23 for actuating the piston pump 21 and the gear pump 22 and a kinematic transmission 24 (indicated schematically in broken lines) for connecting the driving shaft 9 to the actuating shaft 23. The high-pressure pumping system 17 supplies the fuel at an average pressure greater than 6 bar at a running speed of 750 rpm of the driving shaft (9).

The exhaust unit 5 comprises an exhaust pipe 25, which is connected to the cylinders 8; a turbine 26, which is housed inside the exhaust pipe 25 and is connected by a shaft 27 to the compressor 11; a combustion chamber 28 arranged along the exhaust pipe 25; and a particulate filter 29 which is housed inside the exhaust pipe 25 downstream of the combustion chamber 28.

The supply unit 3 is connected to the exhaust unit 5 by means of a bypass pipe 30; more specifically, the bypass pipe 30 is arranged along the supply pipe 10 downstream of the compressor 11 and, along the exhaust pine 25, upstream of the combustion chamber 28. A regulating valve 31 and a heater 32 for heating the air to a temperature close to the temperature of the exhaust gases are arranged in succession along the bypass pipe 30.

The supply device 6 is able to provide the fuel necessary for post-combustion in the combustion chamber 28 upstream of the particulate filter 29 and comprises a fuel supply line 33 which connects the high-pressure pumping unit 17 to the exhaust pipe 25 immediately upstream of the combustion chamber 28; a union 34 for connecting the supply line 33 to the high-pressure pumping unit 17; a fuel injector 35 designed to inject the fuel into the exhaust pipe 25; an intercept valve 36 of the ON/OFF type for selectively supplying the fuel along the supply line 33; and a control unit 37.

The control unit 37 is designed to cause activation of the cycle for regeneration of the particulate filter 29 and therefore to meter the fuel flow inside the exhaust pipe 25 depending on saturation of the particulate filter 29 and the temperature of the exhaust gases in the exhaust pipe 25.

More specifically, the exhaust pipe 25 is equipped with a differential pressure sensor 38 for detecting the difference in pressure upstream and downstream of the particulate filter 29 and emitting a signal DP related to the pressure difference; a temperature sensor 39 arranged upstream of the combustion chamber 28 and designed to emit a temperature signal T1; and a temperature sensor 40 arranged between the combustion chamber 28 and the particulate filter 29 and designed to emit a temperature signal T2.

During use, the control unit 37 compares the signal DP with a threshold value DPS in a comparison unit 41; when the signal DP is greater than the threshold value DPS, the control unit 37 emits a regeneration signal RS which opens the intercept valve 36. The signals T1 and T2 are compared with a value TA for auto-combustion of the particulate and a safety value TS. In practice, the auto-combustion value TA is related to the auto-combustion temperature of the particulate, namely the temperature beyond which the particulate burns and is converted into carbon monoxide, while the safety value TS is related to a temperature, beyond which the structural parts of the exhaust unit 5 could be subject to damage caused by the high temperatures associated with post-combustion and the exhaust gases.

Basically, the control unit 37 compares the temperature signals T1 and T2 with the auto-combustion value TA and safety value TS in a comparison unit 42 and emits a metering signal DS for activating the fuel injector 35 on the basis of algorithms which keep the temperature signal T2 as high as possible and in any case higher than the auto-combustion value TA, without the risk of exceeding the safety value TS.

The union 34 of the supply device 6 comprises a constriction 43 along the fuel flow cross-section for damping the pressure fluctuations produced by the gear pump 22. Moreover, the constriction 43 has the advantage of avoiding a drop in pressure within the high-pressure pumping unit 17 when part of the fuel is bled off for post-combustion. The constriction (43) attenuates the pressure fluctuations upstream, reducing them to within ±0.5 bar of the average value.

The method described is cost-effective because the modifications required to adapt a generic high-pressure pumping unit to this new function are of a relatively limited nature. In fact it is required to add to the high-pressure pumping unit 17 an additional outlet essentially defined by an outlet pipe 44 which can be engaged with the union 34 so as to supply the fuel pumped by the gear pump 22 to the exhaust gas pipe 25.

Although in the present description specific reference has been made to a particular form of regeneration, application of the present invention extends to any form of regeneration of the particulate filter which requires the use of fuel.

The foregoing relates to the preferred exemplary embodiment of the invention, it being understood that other variants and embodiments thereof are possible within the spirit and scope of the invention, the latter being defined by the appended claims.

What is claimed is:

1. A method for regenerating a particulate filter of an internal-combustion engine, comprising the steps of:
    supplying comburent air into an exhaust pipe upstream of the particulate filter in order to perform post-combustion in the exhaust pipe;
    supplying fuel to cylinders of the internal-combustion engine by means of a high-pressure pumping unit;
    supplying the fuel into the exhaust pipe by means of the high-pressure pumping unit, said high-pressure pumping unit comprises a piston pump and a gear pump designed to supply the piston pump;
    said method step of supplying comprises supplying the fuel into the exhaust pipe by means of the gear pump; and
    constricting said fuel supply from said high-pressure pumping unit directly downstream of said high-pressure pumping unit.

2. The method according to claim 1, further comprising the step of metering the fuel in the exhaust pipe by means of a fuel injector.

3. The method according to claim 1, further comprising the step of selectively interrupting/allowing the flow of fuel between the high-pressure pumping unit and the exhaust gas pipe by means of an intercept valve arranged along a fuel supply line extending between the high-pressure pumping unit and the exhaust pipe.

4. The method according to claim 2, further comprising the step of selectively interrupting/allowing the flow of fuel between the high-pressure pumping unit and the exhaust gas pipe by means of an intercept valve arranged along a fuel supply line extending between the high-pressure pumping unit and the exhaust pipe.

5. The method according to claim 3, wherein the intercept valve is an ON/OFF electric valve which is normally closed; the method envisaging opening the intercept valve by means of a regeneration signal emitted by a control unit.

6. The method according to claim 4, wherein the intercept valve is an ON/OFF electric valve which is normally closed; the method envisaging opening the intercept valve by means of a regeneration signal emitted by a control unit.

7. The method according to claim 1, further comprising the step of supplying the fuel at an average pressure greater than 6 bar at a running speed of 750 rpm of a driving shaft of the internal combustion engine.

8. An internal-combustion engine comprising:
    a drive unit provided with cylinders;
    an exhaust unit having a particulate filter;
    a comburent-air supply unit supplying the cylinders and the exhaust unit with comburent air;
    a fuel supply unit supplying fuel to the cylinders, the fuel supply unit having a high-pressure pumping unit;

a device for supplying post-combustion fuel to the exhaust unit, said supply device including a supply line connected to a pressurized fuel outlet of the high-pressure pumping unit;

said high-pressure pumping unit comprises a piston pump and a gear pump, wherein the pressurized fuel outlet is arranged between the gear pump and the piston pump; and said supply device comprises a union connected to an outlet pipe of the high-pressure pumping unit, the union having a constriction for a fuel flow cross-section which attenuates pressure fluctuations upstream, reducing the pressure fluctuations to within ±0.5 bar of an average value thereof.

9. The engine according to claim 8, wherein the supply device comprises a fuel injector for metering the fuel in the exhaust unit.

10. The engine according to claim 8, wherein the supply device comprises an intercept valve arranged along a fuel supply line extending between the high-pressure pumping unit and an exhaust pipe for selectively interrupting/allowing the flow of fuel between the high-pressure pumping unit and the exhaust pipe.

11. The engine according to claim 9, wherein the supply device comprises an intercept valve arranged along a fuel supply line extending between the high-pressure pumping unit and an exhaust pipe for selectively interrupting/allowing the flow of fuel between the high-pressure pumping unit and the exhaust pipe.

12. The engine according to claim 9, wherein the intercept valve is an ON/OFF electric valve which is normally closed, and the intercept valve is opened by means of a regeneration signal emitted by a control unit.

13. The engine according to claim 11, wherein the intercept valve is an ON/OFF electric valve which is normally closed, and the intercept valve is opened by means of a regeneration signal emitted by a control unit.

14. The engine according to claim 8, further comprising the high-pressure pumping unit supplies the fuel at an average pressure greater than 6 bar at a running speed of 750 rpm of a driving shaft of the internal combustion engine.

\* \* \* \* \*

UNITED STATES PATENT AND TRADEMARK OFFICE
CERTIFICATE OF CORRECTION

PATENT NO. : 8,371,110 B2  Page 1 of 1
APPLICATION NO. : 12/602209
DATED : February 12, 2013
INVENTOR(S) : Pinto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
First Day of September, 2015

Michelle K. Lee
*Director of the United States Patent and Trademark Office*